United States Patent [19]

Yokota

[11] Patent Number: 4,864,711
[45] Date of Patent: Sep. 12, 1989

[54] METHOD OF PRODUCING LINED HUME PIPE

[75] Inventor: Sueo Yokota, Nagahama, Japan

[73] Assignees: Mitsubishi Plastics Industries Limited; Haneda Humepipe Co., Ltd., both of Tokyo, Japan

[21] Appl. No.: 197,915

[22] Filed: May 24, 1988

[30] Foreign Application Priority Data

May 29, 1987 [JP] Japan .................... 62-134107

[51] Int. Cl.$^4$ ............ B23P 25/00; B21D 39/04
[52] U.S. Cl. .................... 29/458; 29/421.1; 29/507; 29/511; 29/523
[58] Field of Search .......... 29/421 R, 506, 507, 29/509, 510, 511, 523, 458

[56] References Cited

U.S. PATENT DOCUMENTS

| | | | |
|---|---|---|---|
| 4,332,073 | 1/1982 | Yoshida et al. | 29/523 X |
| 4,359,811 | 11/1982 | Monroe | 29/523 X |
| 4,377,894 | 3/1983 | Yoshida | 29/523 X |
| 4,388,752 | 6/1983 | Vinciguerra et al. | 29/523 X |
| 4,403,385 | 9/1983 | Kirk | 29/507 X |
| 4,418,556 | 12/1983 | Galle et al. | 29/421 X |
| 4,449,281 | 5/1984 | Yoshida et al. | 29/447 X |
| 4,451,964 | 6/1984 | Ludwig | 29/511 X |
| 4,483,065 | 11/1984 | Meyer et al. | 29/507 X |
| 4,635,333 | 1/1987 | Finch | 29/523 X |

FOREIGN PATENT DOCUMENTS 59-5049  1/1984  Japan .
59-91022 5/1984  Japan .

Primary Examiner—Timothy V. Eley
Assistant Examiner—Peter Dungba Vo
Attorney, Agent, or Firm—Oblon, Spivak, McClelland, Maier & Neustadt

[57] ABSTRACT

A method of producing a lined Hume pipe wherein an inner surface of a Hume pipe having a large-diameter socket at one end thereof and a spigot at the other end is covered with a synthetic resin pipe. The method includes the steps of (1) inserting the synthetic resin pipe into the Hume pipe and fitting end caps with the projecting end portions of the synthetic resin pipe in such a manner that the socket and the spigot are closed by the end caps; (2) inducing a heating medium into the synthetic resin pipe so as to soften the same, inducing a pressurized fluid to expand the same until the synthetic resin pipe comes into almost tight contact with the inner surface of the Hume pipe, and ejecting the pressure fluid; (3) removing one of the end caps cutting away the projecting end portion, press-fitting a die into the end portion so as to make the synthetic resin pipe tightly contact with the inner surface of the socket; (4) closing the opposite end portions, inducing the heating medium again to soften the same, inducing the pressure fluid again until the outer surface of the synthetic resin pipe comes into complete contact with the inner surface of the Hume pipe, and ejecting the pressurized fluid and (5) heating to soften the end portion of the synthetic resin pipe and folding outwardly the projecting end portion to cover an end surface and an outer surface of the spigot of the Hume pipe.

6 Claims, 2 Drawing Sheets

METHOD OF PRODUCING LINED HUME PIPE

FIELD OF THE INVENTION

The present invention relates to a method of producing a lined Hume pipe (or lined concrete pipe) wherein an inner surface of a Hume pipe having a large-diameter socket at one end thereof and a spigot at the other end is covered integrally with a synthetic resin pipe.

BACKGROUND OF THE INVENTION

Recently, such a lined Hume pipe obtained by covering the inner surface of the Hume pipe with a synthetic resin pipe has been used for a sewer pipe to be embedded in the ground.

The applicant proposed a method of producing such a lined Hume pipe in Japanese Unexamined Patent Publication No. 5049/1984. The prior art method yet has some problems in respect to tight contact between the Hume pipe and the synthetic resin pipe and in respect to productivity.

In the prior art method, the synthetic resin pipe is inserted into the Hume pipe, after which it is expanded to come into tight contact with the inner surface of the Hume pipe. However, as this method includes only a single expansion step, a sufficiently tight contact cannot be obtained. Accordingly, in using the lined Hume pipe obtained by the prior art method for the sewer pipe for a long period of time, there is a possibility that the synthetic resin pipe may peel off from the inner surface of the Hume pipe.

Furthermore, in the prior art method, prior to heating and expanding of the synthetic resin pipe inserted into the Hume pipe, one end portion of the synthetic resin pipe is folded outwardly to cover the outer peripheral surface of the spigot of the Hume pipe. However, as the synthetic resin pipe is not fixed in the Hume pipe when it is folded outwardly, the folding operation is very troublesome to carry out. As a result, productivity is reduced.

OBJECT OF THE INVENTION

It is an object of the present invention to provide a method of producing a lined Hume pipe which ensures tight contact of the synthetic resin pipe to the inner surface of the Hume pipe.

It is another object of the present invention to provide a method of producing a lined Hume pipe which improves the productivity of the lined Hume pipe.

SUMMARY OF THE INVENTION

According to the present invention, there is provided a method of producing a lined Hume pipe wherein an inner surface of a Hume pipe having a large-diameter socket at one end thereof and a spigot at the other end is covered with a synthetic resin pipe. The method comprises the following first to fifth steps.

(1) First Step

Inserting the synthetic resin pipe into the Hume pipe in such a manner that opposite end portions of the synthetic resin pipe project from an end of the socket and from an end of the spigot of the Hume pipe, and fitting end caps with the projecting end portions of the synthetic resin pipe in such a manner that the socket and the spigot are closed by said end caps. The synthetic resin pipe is formed of thermoplastic synthetic resin such as rigid vinyl chloride resin, polyethylene resin or polypropylene resin, or it may be a thermal expansive synthetic resin pipe having a property of expanding its diameter with heat.

(2) Second Step

Inducing a heating medium into the synthetic resin pipe so as to soften it, inducing a pressure fluid into the synthetic resin pipe so as to expand it until the synthetic resin pipe comes into almost tight contact with the inner surface of the Hume pipe, and ejecting the pressure fluid from the synthetic resin pipe. The heating medium includes ethylene glycol, steam or the like, and the pressure fluid includes compressed air, pressure oil or the like having a gauge pressure of 0.5–5 kg/cm$^2$.

(3) Third Step

Removing one of the end caps fitted with the projecting end portion at the socket, cutting away the projecting end portion, press-fitting a die into the end portion of the synthetic resin pipe covering the inner surface of the socket of the Hume pipe, so as to make the synthetic resin pipe tightly contact with the inner surface of the socket.

(4) Fourth Step

Closing the opposite end portions, inducing the heating medium again into the synthetic resin pipe so as to soften it, inducing the pressure fluid again into the synthetic resin pipe until the outer surface of the synthetic resin pipe comes into complete contact with the inner surface of the Hume pipe, and ejecting the pressure fluid from the synthetic resin pipe. The heating medium and the pressure fluid to be used in the fourth step may be similar to those used in the second step and the gauge pressure of the pressure fluid in the fourth step is preferably 0.5–7 kg/cm$^2$.

(5) Fifth Step

Heating to soften the end portion of the synthetic resin pipe projecting from the end of the spigot of the Hume pipe by means of a hot blast heater, gas burner or the like, and folding outwardly the projecting end portion of the synthetic resin pipe in such a manner as to cover an end surface and an outer surface of the spigot of the Hume pipe.

As mentioned above, the synthetic resin pipe is expanded in two steps. That is, in the first expansion step, the synthetic resin pipe is brought into almost tight contact with the inner surface of the Hume pipe, and, in the second expansion step, the synthetic resin pipe is brought into completely tight contact with the inner surface of the Hume pipe. Therefore, the tight contact of the synthetic resin pipe may be greatly improved as compared with the conventional method employing a single expansion step.

Furthermore, after the synthetic resin pipe is completely fixed to the inner surface of the Hume pipe, the end portion of the synthetic resin pipe projecting from the end of the spigot of the Hume pipe is folded outward to cover the outer peripheral surface of the spigot. Therefore, the folding operation of the end portion of the synthetic resin pipe may be simply carried out, thereby greatly improving the productivity of lined Hume pipe.

Other objects and features of the invention will be more fully understood from the following detailed description and appended claims when taken with the accompanying drawings.

DETAILED DESCRIPTION OF THE PRESENTLY PREFERRED EMBODIMENT

There will now be described a preferred embodiment of the present invention with reference to the drawings.

EXAMPLE 1

(1) First Step

Figure 1:
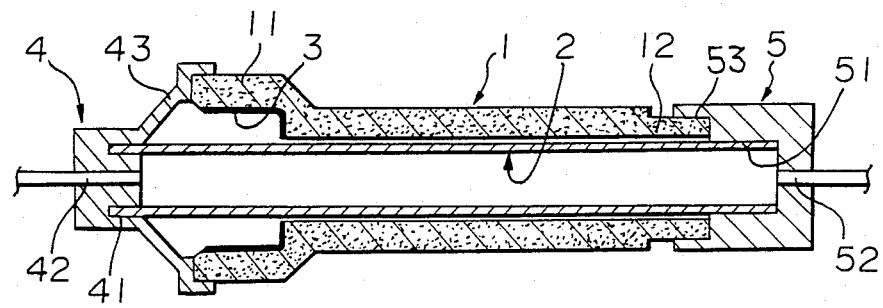
FIGS. 1 to 5 are vertical sectional views of the preferred embodiment showing each step of the present invention.

Referring to FIG. 1, reference numeral 1 designates a Hume pipe having an inner diameter of 200 mm, an outer diameter of 258 mm and a full length of 2090 mm. Silicone resin 3 having a viscoelasticity is coated on an inner surface of a socket 11 of the Hume pipe 1. Reference numeral 2 designates a synthetic resin pipe covering an inner surface of the Hume pipe 1. The synthetic resin pipe 2 is a rigid vinyl chloride resin pipe having a thermal expanding property (coefficient of thermal expansion: about 15%) and having an outer diameter of 196 mm, a wall thickness of 2 mm and a full length of 2340 mm.

The vinyl chloride resin pipe 2 is inserted into the Hume pipe 1, and opposite end portions of the resin pipe 2 are projected from the end of the socket 11 of the Hume pipe 1 and from the end of a spigot 12 of the Hume pipe 1.

Then, the vinyl chloride resin pipe 2 is set in the Hume pipe 1 by using end caps 4 and 5. That is, one end portion of the vinyl chloride resin pipe 2 is inserted into an annular groove 41 in the end cap 4, and an end portion of a conical flange 43 on the end cap 4 is fitted to the socket 11 of the Hume pipe 1. On the other hand, the other end portion of the vinyl chloride resin pipe 2 is inserted into a cylindrical portion 51 of the end cap 5, and an open end 52 of the cylindrical portion 51 is fitted to the spigot 12 of the Hume pipe 1.

(2) Second Step

Steam (at about 110° C.) is induced through a hole 42 in the end cap 4 into the vinyl chloride resin pipe 2, and simultaneously the steam is ejected from a hole 52 in the end cap 5. Thus, the steam is circulated through the vinyl chloride resin pipe 2 for 5 minutes to heat and soften the vinyl chloride resin pipe 2. Just after such a heating step, compressed air having a gauge pressure of 1.5 kg/cm² is induced into the vinyl chloride resin pipe 2 to expand the same and make the outer surface of the vinyl chloride resin pipe 2 almost contact with the inner surface of the Hume pipe 1. After such a contact condition is maintained for 3 minutes, the compressed air is ejected.

(3) Third Step

Figure 2:
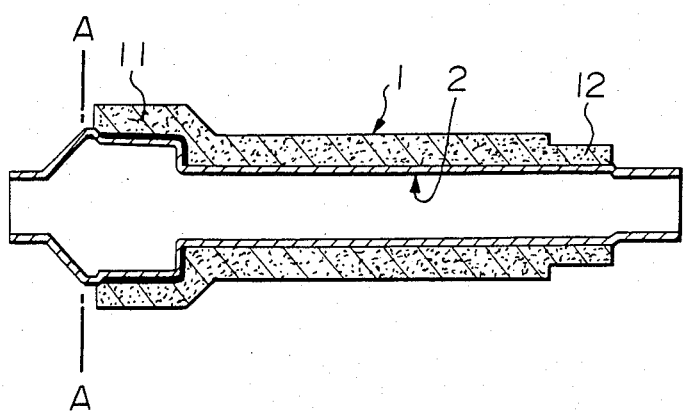

As shown in FIG. 2, both the end caps 4 and 5 are removed from the opposite ends of the vinyl chloride resin pipe 2. Then, the end portion of the vinyl chloride resin pipe 2 projecting from the socket 11 is cut at a position slightly outside of the end of the socket 11 (namely, along a line A—A shown in FIG. 2).

Figure 3:
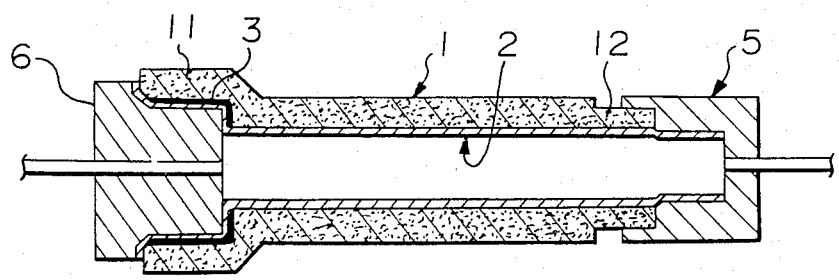

Then, as shown in FIG. 3, a block 6 heated at about 90° C. is press-fitted into the end portion of the vinyl chloride resin pipe 2 covering the inner surface of the socket 11 of the Hume pipe 1, so as to make the vinyl chloride resin pipe 2 loosely contacting the inner surface of the socket 11 completely contact therewith. Thus, the outer surface of the end portion of the vinyl chloride resin pipe 2 is firmly bonded to the inner surface of the socket 11 of the Hume pipe 1 by the silicone resin 3.

(4) Fourth Step

While the block 6 is maintained fitted in the socket 11 of the Hume pipe 1, the end cap 5 is again fitted with the other end portion of the vinyl chloride resin pipe 2 projecting from the spigot 12 as shown in FIG. 3, thus closing the opposite ends of the vinyl chloride resin pipe 2.

Then, steam (at about 110° C.) is again circulated through the vinyl chloride resin pipe 2 for 3 minutes to heat and soften the same. Just after the heating step, compressed air having a gauge pressure of 1.5 kg/cm² is again induced into the vinyl chloride resin pipe 2 to further expand the same and thereby make the outer surface of the vinyl chloride resin pipe 2 tightly contact with the inner surface of the Hume pipe 1. After such a tight contact condition is maintained for 1.5 minutes, the compressed air is ejected.

(5) Fifth Step

Figure 4:
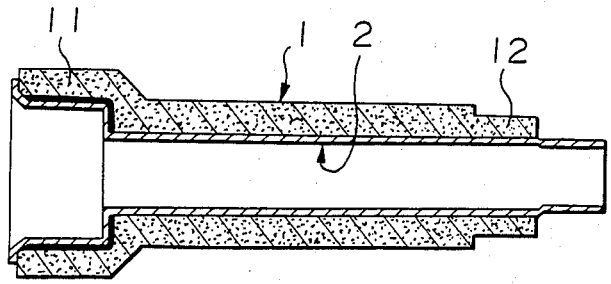
Figure 5:
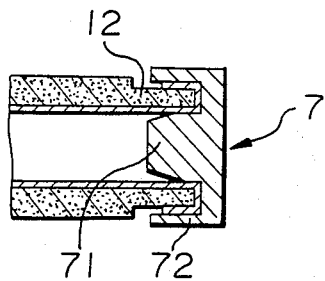

As shown in FIG. 4, the block 6 and the end cap 5 are removed from the opposite ends of the vinyl chloride resin pipe 2. Then, the end portion of the vinyl chloride resin pipe 2 projecting from the spigot 12 of the Hume pipe 1 is heated and softened by a hot blast heater. Then, as shown in FIG. 5, the projecting end portion of the vinyl chloride resin pipe 2 is folded outward by hand, and a forming die 7 is pressed into the folded portion of the pipe 2. The forming die 7 consists of an inner projecting portion 71 and an outer cylindrical portion 72. When the forming die 7 is fitted with the end portion of the vinyl chloride resin pipe 2, the folded end portion of the pipe 2 is pressed by the outer cylindrical portion 72, and it is thereby brought into tight contact with the end surface and the outer peripheral surface of the spigot 12. At the same time, the inside end portion of the vinyl chloride resin pipe 2 slightly separated from the inner surface of the spigot 12 is pressed outwardly against the inner surface of the spigot 12 of the Hume pipe 1, thus ensuring tight contact of the vinyl chloride resin pipe 2 with the Hume pipe 1 at the spigot 12.

Figure 6:
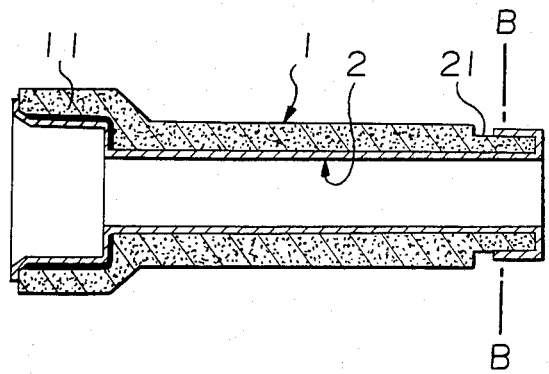
FIG. 6 is a vertical sectional view of the lined Hume pipe obtained by the present invention.

Then, as shown in FIG. 6, an excess portion of the vinyl chloride resin pipe 2 covering the outer surface of the spigot 12 is cut away at a position shown by a line B—B.

Thus, the outer surface of the vinyl chloride resin pipe 2 can be firmly contacted to the outer surface of the Hume pipe 1. The lined Hume pipe as obtained above provides a long service life with no separation of the lining.

EXAMPLE 3

(1) First Step

Used is a Hume pipe 1 having an inner diameter of 400 mm, an outer diameter of 477 mm and a full length of 2525 mm. Polyurethane resin 3 havine a viscoelasticity is coated on an inner surface of a socket 11 of the Hume pipe 1. On the other hand, as the synthetic resin pipe for covering the inner surface of the Hume pipe 1, used is a rigid vinyl chloride resin pipe 2 having a thermal expanding property (coefficient of thermal expansion: about 20%) and having an outer diameter of 395 mm, a wall thickness of 3.5 mm and a full length of 2770 mm. An adhesive such as chloroprene rubber is uniformly applied to the outer surface of the vinyl chloride resin pipe 2, and it is dried. Then, the vinyl chloride resin pipe 2 is inserted into the Hume pipe 1, and opposite end portions of the resin pipe 2 are projected from the end of the socket 11 of the Hume pipe 1 and from the end of a spigot 12 of the Hume pipe 1. Then, in the same manner as in the First Step of Example 1, the vinyl chloride resin pipe 2 is set in the Hume pipe 1 by using the end caps 4 and 5.

(2) Second Step

Steam (at about 110° C.) is circulated through the vinyl chloride resin pipe 2 for 7 minutes to heat and soften the same. Just after the heating step, a compressed air having a gauge pressure of 1.5 kg/cm$^2$ is induced into the vinyl chloride resin pipe 2 to expand the same and make the outer surface of the vinyl chloride resin pipe 2 almost contact with the inner surface of the Hume pipe 1. After such a contact condition is maintained for 4 minutes, the compressed air is ejected.

(3) Third Step

In the same manner as in the Third Step of Example 1, the end portion of the vinyl chloride resin pipe 2 is firmly bonded to the inner surface of the socket 11 of the Hume pipe 1.

(4) Fourth Step

In the same manner as in the Fourth Step of Example 1, the opposite ends of the vinyl chloride resin pipe 2 are closed. Then, steam (at about 110° C.) is circulated through the vinyl chloride resin pipe 2 for 4 minutes, so as to heat and soften the same. Just after the heating step, compressed air having a gauge pressure of 1.7 kg/cm$^2$ is induced into the vinyl chloride resin pipe 2 to make the outer surface of the resin pipe 2 tightly contact with the inner surface of the Hume pipe 1. After such a tight contact condition is maintained for 2 minutes, the compressed air is ejected.

(5) Fifth Step

In the same manner as in the Fifth Step of Example 1, the end portion of the vinyl chloride resin pipe 2 projecting from the spigot 12 of the Hume pirpe 1 is folded outward, and the forming die 7 is fitted with the folded portion of the resin pipe 2 to bring the same into tight contact with the end surface and the outer peripheral surface of the spigot 12.

The lined Hume pipe is obtained above provided strong bonding of the vinyl chloride resin pipe 2 to the inner surface of the Hume pipe 1 by the adhesive.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

I claim:

1. A method of producing a lined Hume pipe wherein an inner surface of a Hume pipe having a large-diameter socket at one end thereof and a spigot at the other end thereof is covered with a synthetic resin pipe, said method comprising the steps of:

(a) inserting said synthetic resin pipe into said Hume pipe in such a manner that opposite end portions of said synthetic resin pipe project from an end of said socket and from an end of said spigot of said Hume pipe and fitting end caps with said projecting end portions of said synthetic resin pipe in such a manner that said socket and said spigot are closed by said end caps; then (b) inducing a heating medium into said synthetic resin pipe so as to soften the same, inducing a pressurized fluid into said synthetic resin pipe so as to expand the same until said synthetic resin pipe comes into almost tight contact with the inner surface of said Hume pipe, and ejecting said pressurized fluid from said synthetic resin pipe; then (c) removing the one of said end caps fitted with said projecting end portion at said socket, cutting away said projecting end portion, and press-fitting a die into the end portion of said synthetic resin pipe covering the inner surface of said socket of said Hume pipe so as to make said synthetic resin pipe tightly contact with the inner surface of said socket; then (d) closing the opposite end portions of said synthetic resin pipe, inducing a heating medium into said synthetic resin pipe so as to soften the same, inducing a pressurized fluid into said synthetic resin pipe until the outer surface of said synthetic resin pipe comes into complete contact with the inner surface of said Hume pipe, and ejecting said pressurized fluid from said synthetic resin pipe; and then (e) heating to soften the end portion of said synthetic resin pipe projecting from the end of said spigot of said Hume pipe and folding outwardly the projecting end portion of said synthetic resin pipe in such a manner as to cover an end surface and an outer surface of said spigot of said Hume pipe.

2. The method as defined in claim 1, wherein said synthetic resin pipe is formed of rigid vinyl chloride resin, polyethylene resin or polypropylene resin.

3. The method as defined in claim 1, wherein said heating medium used in step (b) is ethylene glycol or steam.

4. The method as defined in claim 1, wherein said pressurized fluid has a gauge pressure of 0.5–5 kg/cm$^2$.

5. The method as defined in claim 1, wherein said heating medium used in step (d) is the same heating medium used in step (b).

6. The method as defined in claim 1, wherein said pressurized fluid used in step (d) is the same pressurized fluid used in step (b).

* * * * *